Jan. 23, 1945. W. M. SCHOLL 2,367,804
METHOD AND APPARATUS FOR FITTING THERMOPLASTIC ARCH SUPPORTS
Filed Dec. 4, 1941
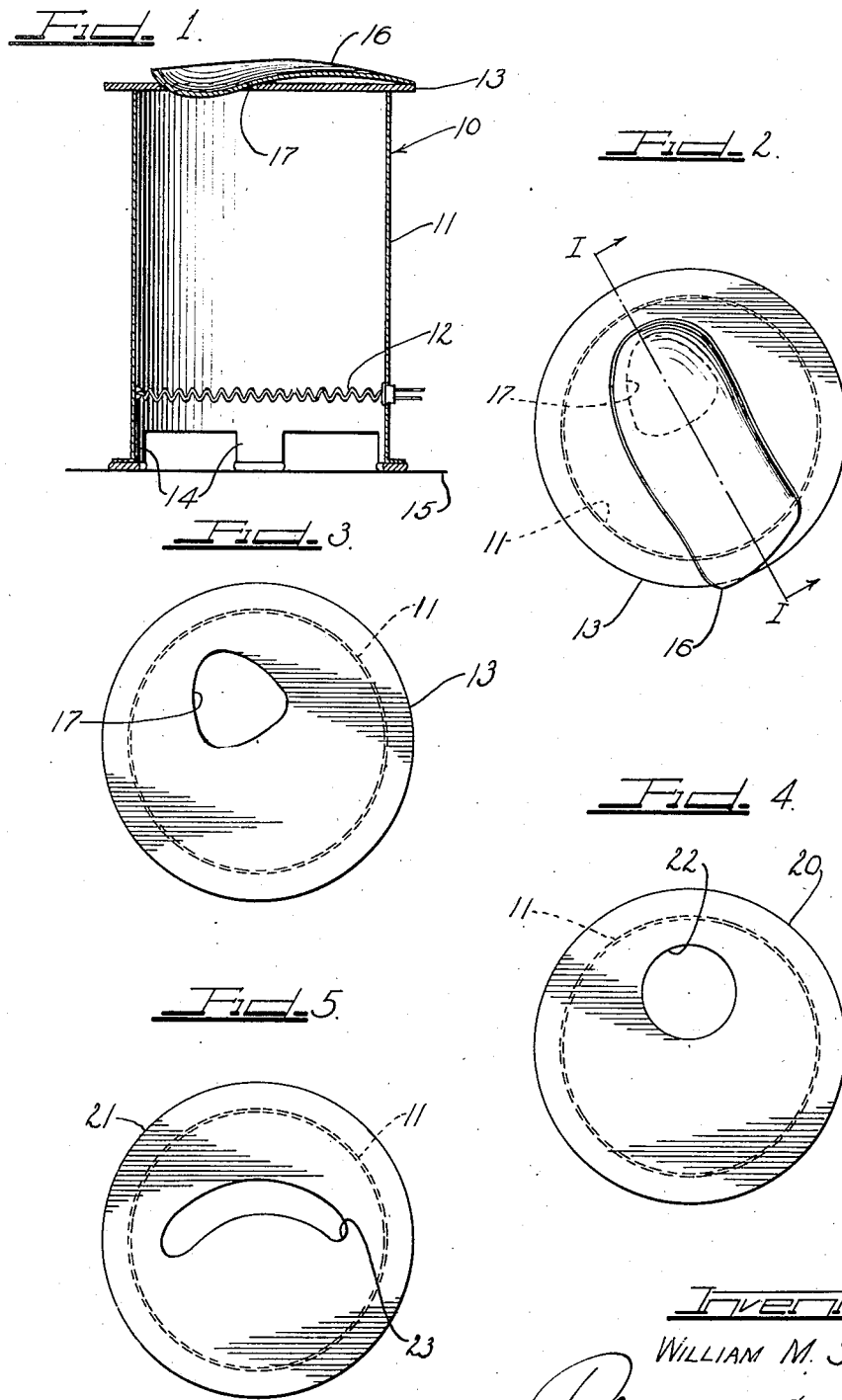
Inventor
WILLIAM M. SCHOLL Patented Jan. 23, 1945

2,367,804

UNITED STATES PATENT OFFICE 2,367,804

METHOD AND APPARATUS FOR FITTING THERMOPLASTIC ARCH SUPPORTS

William M. Scholl, Chicago, Ill.

Application December 4, 1941, Serial No. 421,626

10 Claims. (Cl. 12—1)

This invention relates to methods and means for fitting thermoplastic arch supports to individual feet.

Applicant's copending application Serial No. 423,578 entitled "Plastic arch support," filed December 19, 1941, discloses and claims thermoplastic arch supports or arch support blanks shaped to conform generally to the configuration of a human and capable, after localized softening by gentle heating, of being formed so as to fit any individual foot. Such arch supports or arch support blanks are preferably fabricated from thermoplastic resins such as polymerized vinyl acetates, chlorides, and other vinyl esters softening at between 140° to 150° F.; vinylidene chloride resins softening at 150° to 200° F.; acrylic resins on the order of methyl methacrylate resins softening at 125° to 160° F.; styrene resins softening at 170° to 180° F.; ethyl and other cellulose ethers softening at 170° to 180° F.; cellulose acetate softening at 122° to 200° F.; and, in particular, cellulose acetate butyrate softening at 136° to 200° F.

Such plastic arch supports or arch support blanks are preferably, but not necessarily, transparent, so that fitting and forming can be guided by visual observation.

The above described thermoplastic and optionally transparent arch supports make possible a far more accurate fitting of individual feet than could heretofore be done by selecting the most closely fitting arch support from even a large stock. Transparent arch supports are also fitted much more easily than prior art opaque arch supports, which are fitted principally according to such guidance as is afforded by the tactile sense of the wearer.

The present invention provides means and methods for softening, forming, and fitting the novel thermoplastic arch supports referred to hereinabove. According to the present invention, a stream of warm or hot air is directed exclusively onto that area of the thermoplastic arch support which it is desired to soften for forming purposes. Such forming as may be required is then effected manually or by suitable tools.

Means operative for carrying out the above disclosed method may include an open-ended hollow cylinder or tube provided with an internal heating element. Such a tube or cylinder may be disposed vertically and supported with its lower end elevated to give free access to air, for instance, by means of a stand or by means of legs. The upper end may be covered by a replaceable mask apertured to conform with the outline of any localized arch support area that it is desired to soften, or so as to direct heated air against such an area. Masks are provided having as many apertures of varying sizes and shapes as may be required, the thermoplastic arch supports being disposed on top of a mask with the area to be softened directly above the mask aperture for exposure to the current of hot air issuing therethrough.

It is therefore an important object of the present invention to provide methods for selectively softening any desired area of a thermoplastic arch support or the like to be molded or formed as may be required by the needs of any individual case.

A specific object of the invention is to provide a method of softening a selected area of a thermoplastic article such as an arch support including the step of supporting said article on a mask apertured below said area while directing a current of hot air against said mask.

A further object of this invention is to provide both means for masking all but a selected area of a thermoplastic article such as an arch support which is to be softened locally and means for directing a current of air against said mask.

Another specific object of the invention is to provide means for softening a selected area of an arch support or the like fabricated of thermoplastic material including a mask apertured in conformance with the configuration of the area to be softened and means for supporting said mask in horizontal position so that the arch support or the like may rest thereon, with the selected area aligned with the mask aperture, means for generating a current of hot air and directing the same against the bottom face of said mask also being provided.

Other and further objects and features of the present invention will become apparent from the following description and claims taken in conjunction with the appended drawings showing illustrative examples of apparatus according to this invention, and in which:

Figure 1 is a longitudinal vertical cross section through an apparatus according to this invention including a hollow open-ended cylinder provided with an internal heating element and an apertured mask on top thereof with a thermoplastic arch support resting on the mask to have a localized area softened for forming purposes.

Figure 2 is a plan view of the assembly of Figure 1.

Figure 3 is a plan view showing an assembly similar to that of Figures 1 and 2 without an arch support.

Figure 4 is a plan view showing an assembly similar to those of Figures 1 to 3 but including a mask having a differently shaped aperture from those of Figures 1 to 3.

Figure 5 is a plan view showing an assembly similar to those of Figures 1 to 4 but including a mask having a differently shaped aperture from those of Figures 1 to 4.

The apparatus of the present invention is generally designated in Figure 1 with the reference numeral 10. As shown, the apparatus includes an open-ended, vertically disposed hollow cylinder or tube 11, a heating element 12 disposed therein, and an apertured replaceable mask 13 disposed horizontally over the top of the cylinder with its margins extending over and past the top rim of the cylinder. More particularly, legs 14 hold the cylinder 11 above a supporting surface 15 to afford free ingress of air to the interior of the cylinder 11. When the heating element 12 is energized by an electric current, heated air will rise in the cylinder 11 creating an upwardly directed current of hot air striking the bottom face of the mask 13.

The mask 13 is shown in Figure 3 as being pierced by a generally heart-shaped aperture 17.

As shown in Figures 1 and 2, an arch support 16 whose heel portion is to be softened selectively is disposed over the mask 13 with the heel portion of the arch support over the roughly heart-shaped aperture 17 in the mask 13. Hence, only the heel portion exposed to hot air or radiant heat through the aperture 17 is softened, the mask being made of asbestos or other material resistant to heat and having heat insulating properties. When the heel portion has been softened sufficiently, the arch support may be removed and the heel portion thereof formed as desired manually or by means of suitable tools.

Figures 4 and 5 show assemblies of cylinders and masks 20 and 21 provided, respectively, with a circular aperture 22 and an elongate aperture 23. By means of these and other masks any thermoplastic article such as an arch support may be locally heated to permit forming the same as may be desired to fit any individual case. If, for instance, it is desired to heat that portion of an arch support designed to engage the longitudinal arch of the foot, the mask having the heart-shaped aperture may be removed and a mask having a crescent-shaped aperture is substituted. Similarly, a mask having a circular aperture may be substituted to cup the heel portion of an arch support or the like.

It should be understood that the arch support portion to be softened need not coincide exactly with the edges of the mask aperture, but may extend outside these edges, when the arch support portion to be softened is not seated in the aperture with an exact fit. In the latter case, hot air will flow up between the arch support and the aperture edges, softening the arch support for some distance outside the aperture edges. In such a situation, the arch support area masked off by the apertured mask does not coincide with the mask area between the outer mask edges and the mask aperture edge.

Many details of form and structure may be varied within a wide range without departing from the principles of this invention, and it is therefore not my purpose to limit the patent granted on this invention otherwise than necessitated by the scope of the appended claims.

I claim as my invention:

1. The method of preparing an arch support fitting an individual foot which comprises providing a thermoplastic blank contoured and arched to fit generally a foot having the size of said individual foot but requiring forming of an area thereon for fitting said individual foot, masking off all but said area of said blank and directing a current of hot air thereagainst.

2. The method of preparing an arch support fitting an individual foot which comprises providing a thermoplastic blank contoured and arched to fit generally a foot having the size of said individual foot but requiring forming of an area thereon for fitting said individual foot, masking off all but said area of said blank and directing a current of hot air thereagainst while supporting the blank in horizontal position.

3. The method of preparing an arch support fitting an individual foot which comprises providing a thermoplastic blank contoured and arched to fit generally a foot having the size of said individual foot but requiring forming of an area thereon for fitting said individual foot, masking off the lower face of said blank except an area coextensive with said area and directing heat against the lower face of said blank until selective softening has been effected.

4. A method of preparing an arch support fitting an individual foot which comprises providing a thermoplastic blank contoured and arched to fit generally a foot having the size of said individual foot but requiring forming of an area thereon for fitting said individual foot, masking off all of the lower face of said blank except an area coextensive with said area, supporting said blank in horizontal position with the masked portion thereof, and directing an upward current of hot air thereagainst.

5. The method of preparing an arch support fitting an individual foot which comprises providing a thermoplastic blank contoured and arched to fit generally a foot having the size of said individual foot but requiring forming of an area thereon for fitting said individual foot, masking off all but the said area, directing a current of hot air against said mask until the exposed not masked portion of said blank has been sufficiently softened, and forming the softened portion into fitting relationship.

6. The method of preparing an arch support fitting an individual foot which comprises providing a thermoplastic blank contoured and arched to fit generally a foot having the size of said individual foot but requiring forming of an area thereon for fitting said individual foot, masking off the lower face of said blank except an area coextensive with said area requiring forming while supporting said blank lower face down and in horizontal position from the masked portion thereof, and directing heat against the lower face of said blank.

7. The method of preparing an arch support fitting an individual foot which comprises providing a thermoplastic blank contoured and arched to fit generally a foot having the size of said individual foot, but requiring forming of an area thereon for fitting said individual foot, selectively masking the lower face of said blank to expose exclusively the lower face area corresponding with and coextensive with said area requiring forming while resting the masked portion of said lower blank face against a supporting surface.

8. Apparatus for selectively softening a portion of a thermoplastic arch support or the like to be formed into fitting relationship with an individual foot, said apparatus including means both for masking off the lower face of said arch support except for an area coextensive with said portion and for supporting said arch support, lower face down and in horizontal position, from the masked portion thereof, and means for directing heat against the lower face of said arch support.

9. Apparatus for selectively softening an area of a thermoplastic arch support or the like to be formed locally, said apparatus including an open-ended tubular member, means for supporting said member in vertical position in spaced relation from a supporting surface so that air is afforded free ingress into the bottom of said tube, a heating element within said tube, and a replaceable cover for the top of said tube apertured in conformance with the area of said arch support to be softened, whereby when said arch support is disposed over said cover all but said area is masked off and said area can be selectively softened by a current of hot air generated by said heating element.

10. Means for selectively softening a portion of a thermoplastic arch support or the like including a heating element, means defining a conduit for air heated by said element and capable of supporting with the exit end portion thereof a flat disk in horizontal position, and a flat disk-shaped mask apertured in conformance with the area to be softened and capable, when disposed over the exit end portion of said conduit, of supporting said arch support over the end of said conduit to expose exclusively that portion of said arch support to be softened to hot air generated by said element and passing through said conduit.

WILLIAM M. SCHOLL.